C. H. COPLEY.
ELECTRIC TROLLEY CAR.
APPLICATION FILED MAY 28, 1920.
1,417,502.
Patented May 30, 1922.
2 SHEETS—SHEET 1.
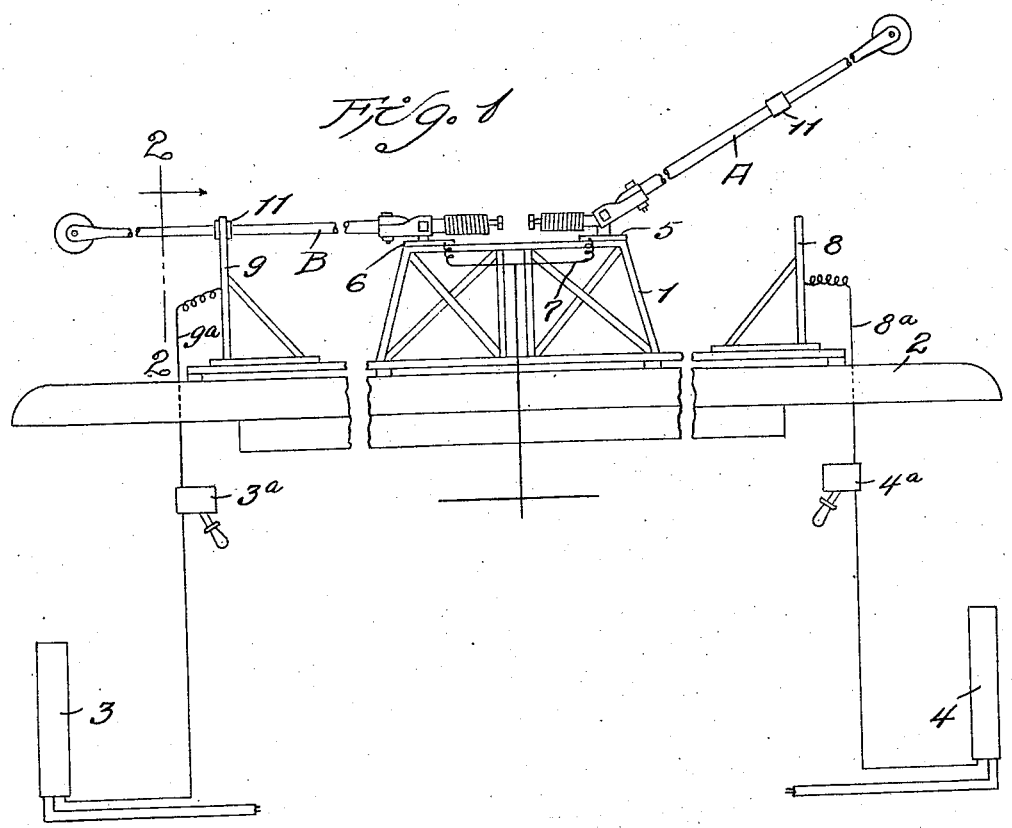
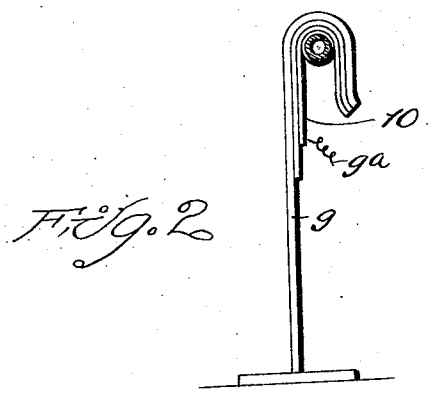
INVENTOR
CHARLES H. COPLEY,
by Bakewell & Church ATTORNEYS.

C. H. COPLEY.
ELECTRIC TROLLEY CAR.
APPLICATION FILED MAY 28, 1920.
1,417,502.
Patented May 30, 1922.
2 SHEETS—SHEET 2.
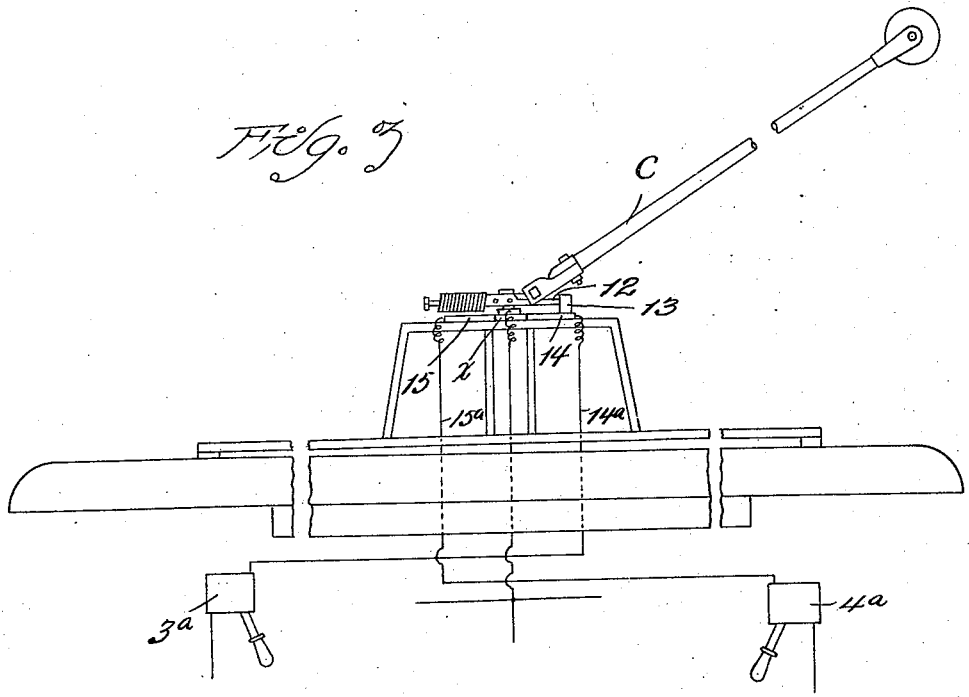
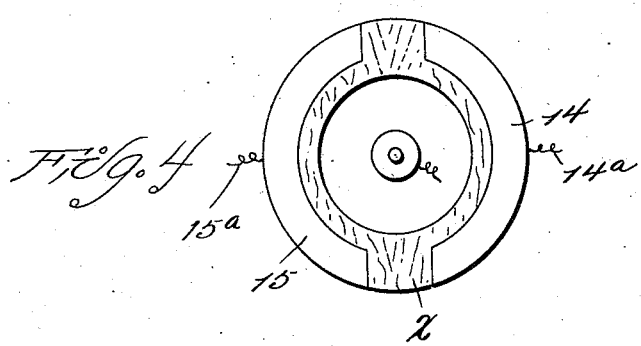
INVENTOR
CHARLES H. COPLEY,
by Bakewell & Church ATTORNEYS.

UNITED STATES PATENT OFFICE.

CHARLES H. COPLEY, OF SPRINGFIELD, MISSOURI, ASSIGNOR OF ONE-HALF TO CLARENCE N. NICHOLS, OF NEW YORK, N. Y.

ELECTRIC TROLLEY CAR.

1,417,502.

Specification of Letters Patent. Patented May 30, 1922.

Application filed May 28, 1920. Serial No. 384,923.

*To all whom it may concern:*

Be it known that I, CHARLES H. COPLEY, a citizen of the United States, residing at Springfield, Missouri, have invented a certain new and useful Improvement in Electric Trolley Cars, of which the following is a full, clear, and exact description, such as will enable others skilled in the art to which it appertains to make and use the same.
This invention relates to electric trolley cars, and has for its main object to provide means which insures the trolley pole of an electric car being properly positioned and the motorman or operator of the car stationed at the front end of the car before the car can be started by said motorman.

Another object is to provide an electric trolley car which is so constructed that the controller at the front end of same cannot be used for starting the car unless the trolley pole of the car projects in an opposite direction to the proposed path of travel of the car.

And still another object is to provide an electric trolley car of the double trolley pole type which is equipped with means for preventing the car from being started if the wheels of both trolley poles are in engagement with the trolley wire and for preventing the car from being started by the controller located at the front end of the car, unless the rear trolley pole is properly positioned and the front trolley pole is locked in an inoperative position.
Figure 1 of the drawings is a diagrammatic view, illustrating an electric trolley car of the double pole type constructed in accordance with my invention.

Figure 2 is a detail view, taken on the line 2—2 of Figure 1, illustrating the means for locking the front trolley pole in an inoperative position and for completing the electric circuit between the rear trolley pole and the controller at the front of the car.
Figure 3 is a diagrammatic view, illustrating my invention embodied in an electric trolley car equipped with a single reversible trolley pole; and Figure 4 is a top plan view, showing the contacts that co-operate with the contact on the revoluble trolley pole base of the car shown in Figure 3.

Referring to Figure 1 of the drawings which illustrates my invention embodied in an electric trolley car of the double pole type, A and B designate the trolley poles of the car, 1 designates a supporting structure on the roof 2 of the car which carries said trolley poles, and 3 and 4 designate the controllers at the opposite ends of the car. In order to insure safety to the car and to the public, I have provided the car with means that prevents the car from being started when the wheels of both trolley poles are in engagement with the trolley wire (not shown) and from being started by the controller at the front end of the car, unless the rear trolley pole is properly positioned and the front trolley pole is locked in an inoperative position. In the form of my invention shown in Figure 1 this is accomplished by establishing electrical connection between both trolley poles and employing locking devices for the trolley poles that are connected with the circuit breakers $3^a$ and $4^a$ at opposite ends of the car in such a manner that the locking device which co-operates with the trolley pole B forms part of the electrical connection between the controller 3 and the trolley pole A at the opposite end of the car and the locking device that co-operates with the trolley pole A forms part of the electrical connection between the controller 4 and the trolley pole B at the opposite end of the car.

When both trolley poles are in their raised position, namely, with their wheels in engagement with the trolley wire, the circuit between the trolley wire and the motors (not shown) of the car is broken. As shown in Figure 1, the base 5 of the trolley pole A is connected with the base 6 of the trolley pole B by an electrical conductor 7 and locking devices 8 and 9 are mounted on the roof of the car to co-operate with the trolley poles A and B, respectively, and hold said trolley poles in a depressed or inoperative position. The locking device 8 is connected by means of an electrical conductor $8^a$ with the circuit breaker $4^a$, and the locking device 9 is connected by means of an electrical conductor $9^a$ with the circuit breaker $3^a$. Each of said locking devices preferably consists of a substantially hook-shaped member mounted on the roof of the car in such a manner that the trolley pole with which said device co-operates can be pulled down and snapped into engagement with the hook-shaped portion on the device, thereby causing the trolley pole to be securely locked in a depressed or inoperative position. The hook-shaped portion of each of said devices is preferably lined with a piece of copper 10 or other suitable material that is a good electrical conductor, and each of the trolley poles is provided with a collar 11 of copper or other suitable electrical conducting material arranged so that the collar 11 on the pole A will be engaged by the copper lining of the locking device 8 when said trolley pole is depressed, and the collar 11 on the pole B will be engaged by the copper lining of the locking device 9 when said trolley pole B is depressed.

Assuming that the car is to travel in such a direction that the controller 3 is located at the front end of the car, it is necessary that the front trolley pole B be locked in an inoperative position and the rear trolley pole A in a raised position with its wheel in engagement with the trolley wire before the circuit to the motors of the car can be closed by the controller 3. This is due to the fact that the circuit from the trolley wire to the motors is through the pole A, through the conductor 7 that connects the bases of the trolley poles, through the locking device 9 and then through the conductor 9ª and circuit breaker 3ª to the front controller 3. At such times the controller 4 at the rear end of the car cannot be used to start the car. Accordingly, my invention makes it necessary for the motorman to be stationed at the front of the car, the rear trolley pole A raised with its wheel in engagement with the trolley wire and the front trolley pole B locked in its depressed position before the car can be started by the motorman. By constructing a car in this manner I insure safety to the car and to the public by eliminating the possibility of the car being run forwardly by a motorman stationed at the rear end of the car or from being operated by a trolley pole that is pointed in the same direction in which the car is to travel.

In Figure 3 of the drawings I have illustrated my invention embodied in an electric street car of the single trolley pole type which is equipped with a reversible trolley pole C mounted on a revoluble base 12 that is provided with a contact 13 which is adapted to co-operate with one or the other of two contacts 14 and 15 insulated from each other by insulating material $x$ and connected by means of electrical conductors 14ª and 15ª with the circuit-breakers 3ª and 4ª, respectively. When the car is to travel in such a direction that the controller 3 is located at the front end of the car, it is necessary that the trolley pole C be arranged in a rearwardly-inclined position in order to furnish current to the motors of the car, due to the fact that the electrical connection between the circuit breaker 3ª and the trolley wire is through the conductor 14ª, the contact 14, and the contact 13 on the base 12 of the trolley pole C. If the trolley pole C were arranged in a forwardly-inclined position, or pointed in the same direction in which the car is to travel, the front controller 3 could not be used to start the car, because the contact 13 on the revoluble base of the trolley pole would be in engagement with the contact 15 that is connected with the circuit breaker 4ª that co-operates with the controller at the rear end of the car. Obviously, when the trolley pole is arranged in its other position, namely, inclined oppositely to the position shown in Figure 1, the car can be started and operated only by the controller 4 at the opposite end of the car.

Having thus described my invention, what I claim as new and desire to secure by Letters Patent, is:

1. In an electric trolley car, a controller, a trolley pole, and means for preventing said controller from being utilized to start and operate the car unless the trolley pole projects rearwardly or in an opposite direction to the proposed path of travel of the car.

2. In an electric trolley car, a trolley pole, controllers arranged at opposite ends of the car, and means that necessitates said trolley pole being arranged in a position pointing towards one end of the car before the car can be started by the controller located at the opposite end of the car.

3. An electric trolley car provided with a trolley pole, controllers located at opposite ends of the car, and means forming part of the circuit between the trolley pole and said controllers that makes it necessary for the trolley pole to be arranged in a rearwardly-inclined position before the controller located at the front end of the car can be used to start the car.

4. An electric trolley car provided with two trolley poles, and means whereby the car cannot be started by the controller at the front end of the car unless the rear trolley pole is in an operative position and the front trolley pole is in an inoperative position.

5. An electric trolley car provided with two trolley poles, and means for preventing the motors of the car from being energized when the wheels of both trolley poles are in engagement with the trolley wire.

6. An electric trolley car provided with two trolley poles, and means for preventing the car from being started when the wheels of both trolley poles are in engagement with the trolley wire, and from being started by the controller at the front end of the car unless the rear trolley pole is properly positioned and the front trolley pole is locked in an inoperative position.

7. An electric trolley car provided with two trolley poles, controllers located at the opposite ends of the car, and means combined with said controllers and trolley poles for establishing electrical connection between the trolley wire and the motors of the car only when the front trolley pole is locked in an inoperative position and the rear trolley pole is elevated with its wheel in engagement with the trolley wire.

8. An electric trolley car provided with two trolley poles, and a locking device for each pole that forms part of the circuit between the trolley wire and the motors when said locking device is in use.

9. An electric trolley car provided with two trolley poles that are electrically connected together, and locking devices for said poles electrically connected to the controllers of the car and arranged so that the circuit will be completed through one of said locking devices and its co-operating trolley pole when the other trolley pole is in its raised or operative position.

10. An electric trolley car provided with two trolley poles that are electrically connected together, controllers at the opposite ends of the car, and locking devices for said trolley poles electrically connected with said controllers in such a manner that the controller at one end of the car can be used to start the car only when the trolley pole at the same end of the car is inoperative and the trolley pole at the opposite end of the pole is operative.

CHARLES F. COPLEY.